C. P. SCHWARZ.
LEAF SPRING.
APPLICATION FILED DEC. 15, 1917.

1,312,140.

Patented Aug. 5, 1919.

INVENTOR.
Constantine P. Schwarz,
By Wilhelm & Parker.
ATTORNEYS.

UNITED STATES PATENT OFFICE.

CONSTANTINE P. SCHWARZ, OF INDIANAPOLIS, INDIANA.

LEAF-SPRING.

1,312,140.    Specification of Letters Patent.    Patented Aug. 5, 1919.

Application filed December 15, 1917. Serial No. 207,356.

*To all whom it may concern:*

Be it known that I, CONSTANTINE P. SCHWARZ, a citizen of the United States, residing at Indianapolis, in the county of Marion and State of Indiana, have invented a new and useful Improvement in Leaf-Springs, of which the following is a specification.

This invention relates to composite springs of the kind comprising a plurality of superimposed leaves or parts.

It is well known that the shock absorbing ability of a leaf spring depends upon the energy absorbed by friction between the leaves of the spring, and this energy is the product of the relative displacement between the leaves of the spring, the pressure between adjacent leaves, and the coefficient of friction.

The objects of the invention are to produce a spring of this kind of improved construction in which the spring leaves are so shaped as to increase the shock absorbing ability of a spring by increasing the coefficient of friction between adjacent leaves; also to improve the construction of springs of this kind in other respects hereinafter specified.

Figure 1:
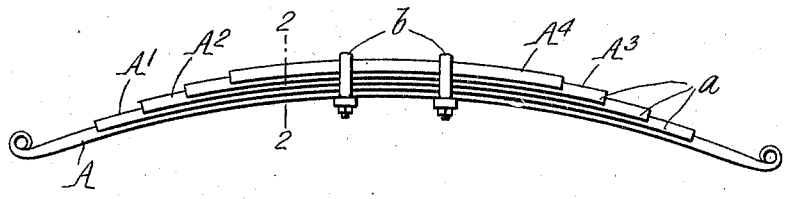
Figure 1 is a side elevation of a leaf spring embodying the invention.

The springs embodying the invention which are shown in the drawings, comprise a plurality of spring leaves, each of which is so shaped as to form a groove in which an adjacent spring leaf is nested, the walls or sides of the grooves being inclined so that the leaves when nested tend to wedge into adjacent leaves and thus greatly increase the friction between the leaves of the spring.

Figure 2:
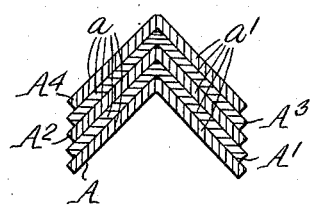
Fig. 2 is a transverse section thereof on line 2—2, Fig. 1.

Referring to Figs. 1 and 2, A represents the main leaf of the spring, and $A'$ $A^2$ $A^3$ and $A^4$ represent the shorter leaves, all of the leaves having inclined sides $a$ $a'$, the spring leaves shown being of substantially inverted V-shape in cross-section and so arranged as to nest within each other. As shown in Fig. 2, the leaves are of substantially uniform thickness and the outer faces of one leaf bear against the inner faces of the adjacent leaf. By means of this arrangement the shock absorbing ability of the spring is greatly increased since the coefficient of friction of a body sliding between two inclined faces is equal to the normal coefficient between two flat faces, divided by the sine of one-half of the angle between the two inclined faces. Since the sine of an angle is always less than one, the coefficient of friction of a body sliding between two oppositely inclined faces must be greater than the coefficient of friction of the same body sliding on a plane surface similar to the inclined faces. The several leaves of the spring are held together by any suitable means, such as shackles or clips $b$.

Figure 3:
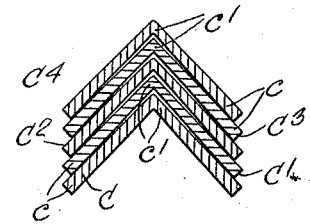
Fig. 3 is a transverse section of a leaf spring of slightly modified construction.
Figure 4:
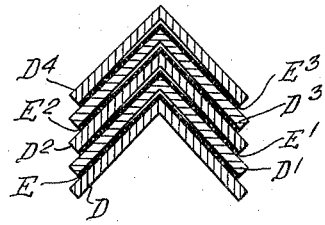
Fig. 4 is a transverse section of a leaf spring of another modified construction.

In the construction shown in Fig. 3, the spring leaves are so shaped as to bear on each other only near the outer portions of the sides of the spring leaves, the apexes of the spring leaves being out of contact with adjacent leaves. This may be accomplished by so forming the spring leaves $C$ $C'$ $C^2$ $C^3$ and $C^4$ that the angle between the outer faces of a spring leaf is slightly greater than the angle between the inner faces of the adjacent leaf, so that when the two leaves are in operative relation to each other, they will touch at the outer portions of the leaves only. This result may be accomplished in any suitable manner, for example, by forming the spring leaves so that the outer portions $c$ thereof are thicker than the portions $c'$ thereof adjacent to the apexes. Other means for accomplishing this result may be used. The advantage of this construction is that if the springs in flexing should tend to flatten or increase the angle between the inclined sides thereof, the apex of an inner leaf would not tend to bear against the adjacent leaf in such a manner as to relieve the inclined sides from pressure, and thus reduce the friction between adjacent leaves and reduce the shock absorbing ability of the spring.

Spring leaves of the construction shown in Fig. 3 also adapt themselves well for use in connection with non-steel inserts which would serve the purpose of increasing the relative displacement between adjacent spring leaves and thereby further increase the shock absorbing ability of the spring as described in my Patent No. 1,219,592, Mar. 20, 1917. In the construction shown in Fig.

4, D D' D² D³, represent the spring leaves, and E E' E² E³ represent inserts of any suitable material, which are arranged between the spring leaves. The formation of the spring leaves so as to cause them to engage the inserts only near the outer portions of the inclined sides of the leaves tends to hold the inserts in place.

Springs of the structure described have the advantage of absorbing shocks in such a way as to very materially reduce the "rebound" of a spring. The angle or V-shaped cross section of the spring leaves also greatly increases the resistance to bending of the individual leaves, so that the leaves may be made of smaller cross-sectional area, thus reducing the amount of material in the spring and reducing the weight of the spring without decreasing the capacity thereof. By making the leaves of inverted V-shape as shown, the leaves act as a roof, preventing water from settling between the leaves of the spring.

I claim as my invention:

1. A leaf spring comprising a plurality of spring leaves having side portions extending lengthwise of the leaves and inclined toward each other to cause the entire pressure between adjacent spring leaves to be transmitted through the contacting inclined sides thereof, whereby the friction between the adjacent leaves is increased.

2. A leaf spring comprising a plurality of leaves each having a groove extending lengthwise of the leaves and having inclined sides, the leaves being nested so that a leaf is wedged between said inclined sides of an adjacent leaf, the entire pressure between adjacent leaves being transmitted through said inclined sides to increase the friction between adjacent leaves.

3. A leaf spring comprising a plurality of leaves each having a groove extending lengthwise of the leaves and having inclined sides, the leaves being nested so that the entire pressure between adjacent spring leaves is transmitted through said inclined sides to increase the friction between adjacent leaves, the leaves being shaped to cause only the outer portions of the inclined sides of the leaves to contact with adjacent leaves.

4. A leaf spring comprising a plurality of leaves each having a groove extending lengthwise of the leaves and having inclined sides, the leaves being nested so that a leaf is wedged between said sides of an adjacent leaf to increase the friction between adjacent leaves, the leaves being shaped so that the included angle between the outer faces of the inclined sides of a leaf is greater than the included angle between the inner faces of the inclined sides of a leaf within which said first mentioned leaf nests, said leaves contacting only at the outer inclined portions of adjacent leaves.

Witness my hand this 8th day of December, 1917.

CONSTANTINE P. SCHWARZ.

Witnesses:
R. H. WHITE,
J. L. DUNBAR.

Copies of this patent may be obtained for five cents each, by addressing the "Commissioner of Patents, Washington, D. C."